(12) United States Patent
Okamoto et al.

(10) Patent No.: US 11,391,690 B2
(45) Date of Patent: Jul. 19, 2022

(54) SENSOR ELEMENT AND GAS SENSOR (71) Applicant: NGK INSULATORS, LTD., Aichi (JP)

(72) Inventors: Taku Okamoto, Nagoya (JP);
Nobukazu Ikoma, Nagoya (JP);
Osamu Nakasone, Inabe (JP)

(73) Assignee: NGK INSULATORS, LTD., Nagoya (JP)

(*) Notice: Subject to any disclaimer, the term of this patent is extended or adjusted under 35 U.S.C. 154(b) by 240 days.

(21) Appl. No.: 16/701,188

(22) Filed: Dec. 3, 2019

(65) Prior Publication Data

US 2020/0200700 A1  Jun. 25, 2020

(30) Foreign Application Priority Data

Dec. 25, 2018  (JP) .............................. JP2018-240983

(51) Int. Cl.
*G01N 27/407* (2006.01)
*G01N 27/41* (2006.01)
*G01N 27/409* (2006.01)

(52) U.S. Cl.
CPC ....... *G01N 27/4071* (2013.01); *G01N 27/409* (2013.01); *G01N 27/4074* (2013.01); *G01N 27/4075* (2013.01); *G01N 27/41* (2013.01)

(58) Field of Classification Search
CPC ........... G01N 27/4071; G01N 27/4075; G01N 27/4074; G01N 27/41; G01N 27/409; G01N 27/4175; G01N 27/419; G01N 27/30; G01N 27/406–41; G01N 33/0004–0075

See application file for complete search history.

(56) References Cited

U.S. PATENT DOCUMENTS

| 5,902,469 A | * | 5/1999 | Kato | .................. G01N 27/4074 204/425 |
| 2010/0243447 A1 | * | 9/2010 | Fujisaki | ............. G01N 27/4075 204/431 |
| 2016/0216229 A1 | * | 7/2016 | Okamoto | ............... G01N 27/41 |

FOREIGN PATENT DOCUMENTS

| EP | 0859233 B1 | * 10/2008 | ......... G01N 27/4074 |
| JP | 5323752 B2 | 10/2013 | |

* cited by examiner

*Primary Examiner* — Joshua L Allen
(74) *Attorney, Agent, or Firm* — Mattingly & Malur, PC (57) ABSTRACT

A sensor element used to detect, using a limiting current method, the specific gas concentration in a rich-atmosphere measurement-object gas. The sensor element includes a layered body in which a measurement-object gas distribution portion is provided, an adjustment pump cell that has an adjustment pump electrode arranged in an oxygen concentration adjustment space in the measurement-object gas distribution portion. The adjustment pump electrode contains Pt and Au, and a Au/Pt ratio (=the area of a portion where Au is exposed/the area of a portion where Pt is exposed) measured using X-ray photoelectron spectroscopy (XPS) is greater than or equal to 0.3 but not greater than 0.63.

6 Claims, 3 Drawing Sheets

SENSOR ELEMENT AND GAS SENSOR

CROSS-REFERENCE TO RELATED APPLICATION

This application claims the benefit of Japanese Patent Application No. 2018-240983, filed Dec. 25, 2018, which is hereby incorporated by reference herein in its entirety.

BACKGROUND OF THE INVENTION

1. Field of the Invention

The present invention relates to a sensor element and a gas sensor.

2. Description of the Related Art

Hitherto, a limiting current type gas sensor is known that detects the specific gas concentration such as NOx in a measurement-object gas such as combustion gas. For example, PTL 1 describes a gas sensor including a layered body having a plurality of oxygen ion conducting solid electrolyte layers, a pump electrode constituting an electrochemical pump cell for adjusting the oxygen partial pressure of an internal void of the layered body, and a measuring electrode arranged inside the layered body. In a case where the concentration of NOx is detected using this gas sensor, first, the concentration of oxygen in a measurement-object gas is adjusted using the pump electrode in the internal void. After the oxygen concentration is adjusted, NOx in the measurement-object gas is then reduced, and the NOx concentration in the measurement-object gas is detected on the basis of a current flowing in the measuring electrode in accordance with the post-reduction oxygen concentration. In addition, PTL 1 describes that the Au abundance ratio at the surface of Pt particles present at the pump electrode (the Au abundance ratio) is greater than or equal to 0.01 but not greater than 0.3. PTL 1 describes that this makes it possible to preferably reduce catalytic activity at the pump electrode and to reduce NOx reduction or decomposition at the electrochemical pump cell for adjusting the oxygen partial pressure, thereby achieving a sufficient measurement accuracy.

CITATION LIST

Patent Literature

[PTL 1] JP 5323752 B

SUMMARY OF THE INVENTION

The use of a rich-atmosphere gas as a measurement-object gas has not been considered so much so far. According to examinations performed by the inventors, in a case where the specific gas concentration in a rich-atmosphere measurement-object gas is measured, the measurement accuracy may suffer if the pump electrode having the Au abundance ratio described in PTL 1 is used.

The present invention has been made to solve such a problem, and the main purpose thereof is to suppress a decrease in the accuracy with which the specific gas concentration is measured in a case where a measurement-object gas is in a rich atmosphere.

The present invention employs the following measures in order to achieve the above-described main purpose.

A sensor element according to the present invention is a sensor element used to detect, using a limiting current method, the specific gas concentration in a rich-atmosphere measurement-object gas, the sensor element including a layered body that has stacked oxygen-ion conducting multiple solid electrolyte layers and in which a measurement-object gas distribution portion for introducing and distributing the measurement-object gas is provided, an adjustment pump cell that has an adjustment pump electrode arranged in an oxygen concentration adjustment space in the measurement-object gas distribution portion and that is for adjusting the concentration of oxygen in the oxygen concentration adjustment space, a measuring electrode arranged in a measurement space provided downstream of the oxygen concentration adjustment space in the measurement-object gas distribution portion, and a reference electrode that is arranged inside the layered body and into which a reference gas serving as a reference for detection of the specific gas concentration is introduced, and the adjustment pump electrode contains Pt and Au, and a Au/Pt ratio (=the area of a portion where Au is exposed/the area of a portion where Pt is exposed) measured using X-ray photoelectron spectroscopy (XPS) is greater than or equal to 0.3 but not greater than 0.63.

The density of a specific gas can be detected using this sensor element as in the following. First, the adjustment pump cell is operated, and the oxygen concentration in the measurement-object gas that is introduced into the measurement-object gas distribution portion is adjusted in the oxygen concentration adjustment space. As a result, the adjusted measurement-object gas reaches the measurement space. A detection value corresponding to oxygen originated from the specific gas and generated in the measurement space is then acquired on the basis of the measurement voltage between the reference electrode and the measuring electrode, and the specific gas concentration in the measurement-object gas is detected on the basis of the acquired detection value. The "oxygen originated from the specific gas and generated in the measurement space" is, for example, in a case where the specific gas is an oxide, oxygen generated by reducing the specific gas itself in the measurement space, and in a case where the specific gas is a non-oxide, oxygen generated by reducing, in the measurement space, a gas obtained after the specific gas is converted into an oxide. When the specific gas concentration is detected in this manner, since the Au/Pt ratio of the adjustment pump electrode is greater than or equal to 0.3, a decrease in the accuracy with which the specific gas concentration is measured can be suppressed in a case where the measurement-object gas is in a rich atmosphere. The reason for this can be considered as in the following. The rich-atmosphere measurement-object gas has low oxygen partial pressure, and thus it is considered that, due to the catalytic activity of Pt in the adjustment pump electrode, the specific gas itself is likely to be reduced in a case where the specific gas is an oxide, and an oxide into which the specific gas is converted is likely to be reduced in a case where the specific gas is a non-oxide. In the following, these kinds of reduction are referred to as "reduction of the specific gas or the like". When such reduction of the specific gas or the like occurs in the oxygen concentration adjustment space, it is considered that the amount of oxygen originated from the specific gas and generated in the measurement space decreases and the specific-gas concentration measurement accuracy decreases. In contrast to this, in the sensor element according to the present invention, since the Au/Pt ratio of the adjustment pump electrode is greater than or equal to 0.3, the existence of Au sufficiently suppresses the catalytic activity of Pt. As a result, it is considered that reduction of the specific gas or the like is sufficiently suppressed in the oxygen concentration adjustment space in a case where the measurement-object gas is in a rich atmosphere and a decrease in the accuracy with which the specific gas concentration is detected is suppressed. In addition, in a case where the Au/Pt ratio of the adjustment pump electrode is too high, the pump performance of the adjustment pump cell is degraded and it may not be possible to appropriately adjust the oxygen concentration in the oxygen concentration adjustment space or application of a high voltage to the adjustment pump cell may be needed to improve the pump performance. In contrast to this, in the sensor element according to the present invention, since the Au/Pt ratio of the adjustment pump electrode is less than or equal to 0.63, a decrease in the pump performance of the adjustment pump cell can be suppressed.

In the sensor element according to the present invention, the layered body may include three or more electrodes including the adjustment pump electrode and the measuring electrode arranged in the measurement-object gas distribution portion, and the adjustment pump electrode may be arranged furthermost upstream among the three or more electrodes arranged in the measurement-object gas distribution portion. Here, in a case where the adjustment pump electrode is arranged furthermost upstream among the plurality of electrodes arranged in the measurement-object gas distribution portion, the oxygen concentration in the measurement-object gas cannot be adjusted upstream of the adjustment pump electrode. Thus, when the Au/Pt ratio of the adjustment pump electrode present at such a position is low, reduction of the specific gas or the like is likely to occur in the oxygen concentration adjustment space in a case where the measurement-object gas is in a rich atmosphere. Thus, by setting the Au/Pt ratio of the adjustment pump electrode present at such a position to 0.3 or higher, a decrease in the accuracy with which the specific gas concentration is measured can be suppressed with more certainty in a case where the measurement-object gas is in a rich atmosphere.

The sensor element according to the present invention may include an auxiliary pump cell that has an auxiliary pump electrode arranged in an auxiliary adjustment space downstream of the oxygen concentration adjustment space in the measurement-object gas distribution portion and that is for adjusting the concentration of oxygen in the auxiliary adjustment space, the auxiliary pump electrode may contain Pt and Au, and a Au/Pt ratio (=the area of a portion where Au is exposed/the area of a portion where Pt is exposed) measured using X-ray photoelectron spectroscopy (XPS) may be lower than the Au/Pt ratio of the adjustment pump electrode. Here, even in a case where the measurement-object gas is in a rich atmosphere, the measurement-object gas whose oxygen concentration has been adjusted reaches the auxiliary adjustment space arranged downstream of the oxygen concentration adjustment space. Thus, the above-described reduction of the specific gas or the like is less likely to occur in the auxiliary adjustment space than in the oxygen concentration adjustment space. Thus, even when the Au/Pt ratio of the auxiliary pump electrode has a lower value than that of the adjustment pump electrode, a decrease in the accuracy with which the specific gas concentration is measured is less likely to occur in a case where the measurement-object gas is in a rich atmosphere. Then, by setting the Au/Pt ratio of the auxiliary pump electrode to relatively low, the pump performance of the auxiliary pump cell can be made relatively high. In this case, the Au/Pt ratio of the auxiliary pump electrode may be less than or equal to 0.3 or may also be less than 0.3. The Au/Pt ratio of the auxiliary pump electrode may also be greater than or equal to 0.01.

In the sensor element according to the present invention, the Au/Pt ratio of the adjustment pump electrode may also be over 0.3. In addition, the specific gas concentration may also be the concentration of NOx or the concentration of ammonia.

The sensor element according to the present invention may be a sensor element used to detect the specific gas concentration in exhaust gas of a gasoline engine. Exhaust gas of a gasoline engine is relatively likely to be in a rich atmosphere, and thus it is meaningful to use the sensor element according to the present invention.

A gas sensor according to the present invention includes
the sensor element according to any one of the above-described modes,
an adjustment-pump-cell control device that operates the adjustment pump cell such that the concentration of oxygen in the oxygen concentration adjustment space becomes a target concentration,
a measurement-voltage detection device that detects a measurement voltage between the reference electrode and the measuring electrode, and
a specific-gas-concentration detection device that acquires, on the basis of the measurement voltage, a detection value corresponding to oxygen originated from the specific gas and generated in the measurement space and that detects, on the basis of the detection value, the specific gas concentration in the measurement-object gas.

This gas sensor includes the sensor element according to any of the above-described modes. Thus, this gas sensor has an effect similar to that of the above-described sensor element according to the present invention, and, for example, has an effect in suppressing a decrease in the specific-gas concentration measurement accuracy in a case where the measurement-object gas is in a rich atmosphere.

In this case, the specific-gas-concentration detection device may pump out oxygen originated from the specific gas and generated in the measurement space from the measurement space to the outside on the basis of the measurement voltage such that the oxygen concentration inside the measurement space becomes a predetermined low concentration, and the measurement pump current that flows when the pumping out is performed may be acquired as the detection value. In addition, in a case where the sensor element includes the auxiliary pump cell, the gas sensor according to the present invention may include an auxiliary-pump-cell control device that operates the auxiliary pump cell such that the oxygen concentration in the auxiliary adjustment space becomes a target concentration.

DETAILED DESCRIPTION OF THE INVENTION

Figure 1:
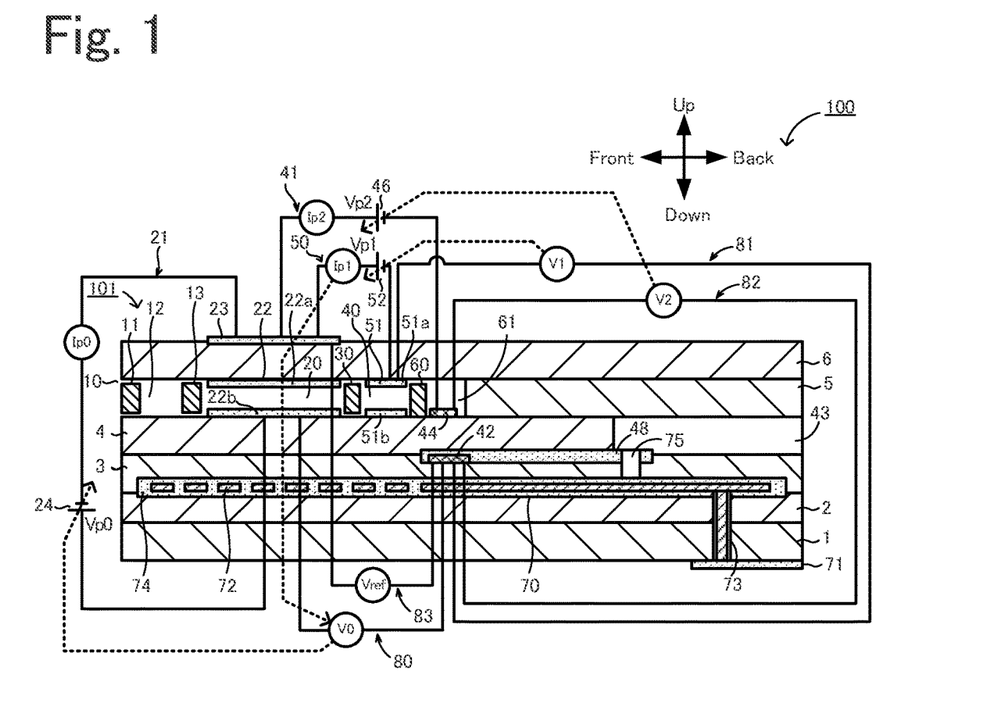
FIG. 1 is a schematic sectional view of a gas sensor 100.
Figure 2:
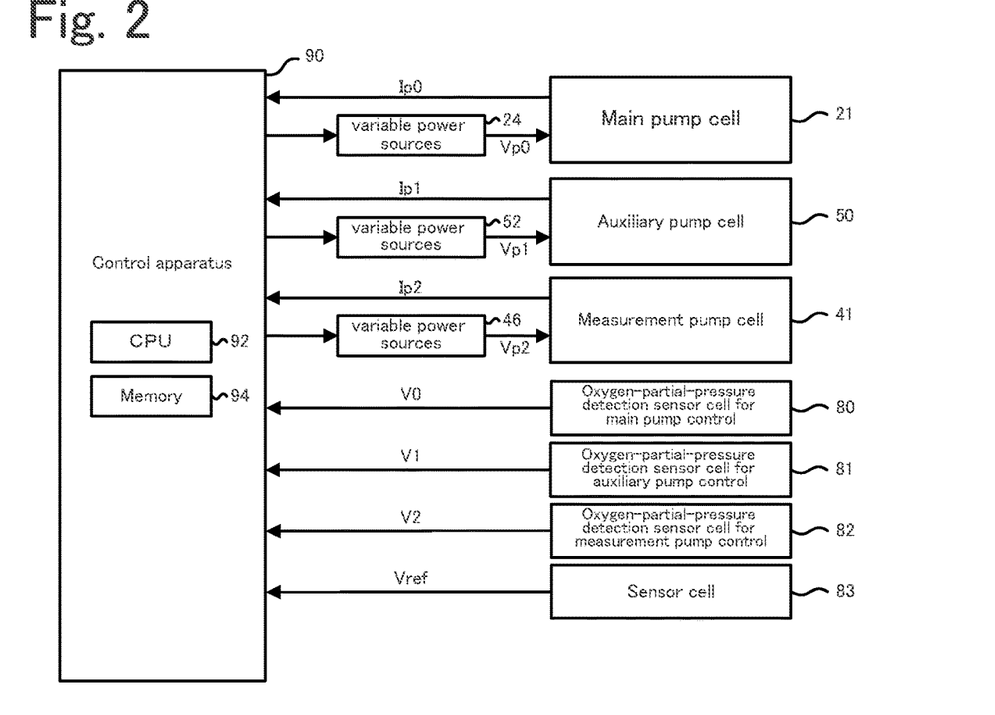
FIG. 2 is a block diagram illustrating an electrical connection relationship between a control apparatus 90 and individual cells.

Next, an embodiment of the present invention will be described using the drawings. FIG. 1 is a schematic sectional view schematically illustrating an example of the configuration of a gas sensor 100, which is an embodiment of the present invention. FIG. 2 is a block diagram illustrating an electrical connection relationship between a control apparatus 90 and individual cells. The gas sensor 100 is attached to, for example, a pipe such as an exhaust gas pipe of an internal combustion engine. The gas sensor 100 treats exhaust gas of the internal combustion engine as a measurement-object gas and detects the specific gas concentration such as NOx or ammonia in the measurement-object gas. In the present embodiment, the gas sensor 100 measures the NOx concentration as the specific gas concentration. The gas sensor 100 includes a sensor element 101 having a long rectangular parallelepiped shape, cells 21, 41, 50, and 80 to 83 that the sensor element 101 has, variable power sources 24, 46, and 52, and the control apparatus 90 for controlling the entirety of the gas sensor 100.

The sensor element 101 is a device having a layered body obtained by stacking six layers that are a first substrate layer 1, a second substrate layer 2, a third substrate layer 3, a first solid electrolyte layer 4, a spacer layer 5, and a second solid electrolyte layer 6 in this order from the bottom as seen in the drawing, each layer being composed of an oxygen ion conducting solid electrolyte layer such as zirconia ($ZrO_2$). In addition, solid electrolytes forming these six layers are dense and airtight. The sensor element 101 is manufactured, for example, by stacking ceramic green sheets corresponding to the respective layers after the ceramic green sheets are subjected to predetermined processing, circuit pattern printing, and the like, and then by sintering and integrating the ceramic green sheets.

On the tip portion side (the left end portion side in FIG. 1) of the sensor element 101, a gas inlet 10, a first diffusion controlling unit 11, a buffer space 12, a second diffusion controlling unit 13, a first internal void 20, a third diffusion controlling unit 30, a second internal void 40, a fourth diffusion controlling unit 60, and a third internal void 61 are formed so as to communicate in this order and to be adjacent to each other between the bottom surface of the second solid electrolyte layer 6 and the top surface of the first solid electrolyte layer 4.

The gas inlet 10, the buffer space 12, the first internal void 20, the second internal void 40, and the third internal void 61 are an internal space of the sensor element 101. The internal space is provided by boring the spacer layer 5, and the top portion of the internal space is partitioned by the bottom surface of the second solid electrolyte layer 6, the bottom portion by the top surface of the first solid electrolyte layer 4, and the side portion by a side surface of the spacer layer 5.

Any of the first diffusion controlling unit 11, the second diffusion controlling unit 13, and the third diffusion controlling unit 30 is provided as two horizontally long slits (the direction of the length of each opening is a direction perpendicular to the drawing). In addition, the fourth diffusion controlling unit 60 is provided as one horizontally long slit formed as a gap below the bottom surface of the second solid electrolyte layer 6 (the direction of the length of the opening is a direction perpendicular to the drawing). Note that a portion extending from the gas inlet 10 to the third internal void 61 is also referred to as a measurement-object gas distribution portion.

In addition, at a position farther than the measurement-object gas distribution portion from the tip end side, a reference gas introduction space 43 is provided at a position at which a side portion of the reference gas introduction space 43 is partitioned by a side surface of the first solid electrolyte layer 4 between the top surface of the third substrate layer 3 and the bottom surface of the spacer layer 5. As a reference gas used when the NOx concentration is measured, for example, air is introduced into the reference gas introduction space 43.

An air introduction layer 48 is a porous ceramic layer, and the reference gas is introduced into the air introduction layer 48 through the reference gas introduction space 43. In addition, the air introduction layer 48 is formed so as to cover a reference electrode 42.

The reference electrode 42 is an electrode formed so as to be sandwiched by the top surface of the third substrate layer 3 and the first solid electrolyte layer 4, and as described above, and the air introduction layer 48 leading to the reference gas introduction space 43 is provided around the reference electrode 42. In addition, as described below, it is possible to measure, using the reference electrode 42, the oxygen concentration (oxygen partial pressure) inside the first internal void 20, that inside the second internal void 40, and that inside the third internal void 61. The reference electrode 42 is formed as a porous cermet electrode (for example, a cermet electrode containing Pt and $ZrO_2$).

In the measurement-object gas distribution portion, the gas inlet 10 is a portion open to the outside space, and the measurement-object gas is taken into the sensor element 101 from the outside space through the gas inlet 10. The first diffusion controlling unit 11 is a portion for adding a predetermined diffusion resistance to the measurement-object gas that has been taken in from the gas inlet 10. The buffer space 12 is a space provided to lead the measurement-object gas that has been introduced by the first diffusion controlling unit 11 to the second diffusion controlling unit 13. The second diffusion controlling unit 13 is a portion for adding a predetermined diffusion resistance to the measurement-object gas that is introduced from the buffer space 12 into the first internal void 20. When the measurement-object gas is introduced from outside the sensor element 101 into the first internal void 20, the measurement-object gas is rapidly taken into the sensor element 101 from the gas inlet 10 due to changes in the pressure of the measurement-object gas in the outside space (in a case where the measurement-object gas is car exhaust gas, the pulsation of the exhaust pressure). The measurement-object gas is not directly introduced into the first internal void 20 but is introduced into the first internal void 20 after the changes in the pressure of the measurement-object gas are canceled out through the first diffusion controlling unit 11, the buffer space 12, and the second diffusion controlling unit 13. As a result of this, the changes in the pressure of the measurement-object gas that is introduced into the first internal void 20 are at an almost ignorable level. The first internal void 20 is provided as a space for adjusting the oxygen partial pressure in the measurement-object gas that has been introduced thereinto through the second diffusion controlling unit 13. The oxygen partial pressure is adjusted by the operation of a main pump cell 21.

The main pump cell 21 is an electrochemical pump cell constituted by an inner-side pump electrode 22, an outer-side pump electrode 23, and the second solid electrolyte layer 6 sandwiched these electrodes. The inner-side pump electrode 22 has a ceiling electrode portion 22a provided on almost the entirety of the bottom surface of the second solid electrolyte layer 6 that faces the first internal void 20. The outer-side pump electrode 23 is provided in a region corresponding to the ceiling electrode portion 22a and positioned on the top surface of the second solid electrolyte layer 6 such that the outer-side pump electrode 23 is exposed to the outside space.

The inner-side pump electrode 22 is formed so as to spread across the upper and lower solid electrolyte layers (the second solid electrolyte layer 6 and the first solid electrolyte layer 4) that partition the first internal void 20, and the spacer layer 5, which provides a side wall. Specifically, the ceiling electrode portion 22a is formed on the bottom surface of the second solid electrolyte layer 6, which provides a ceiling surface of the first internal void 20, and a bottom electrode portion 22b is formed on the top surface of the first solid electrolyte layer 4, which provides a bottom surface of the first internal void 20. A side electrode portion (not illustrated) is formed on a side wall (the inner wall) of the spacer layer 5, which constitutes both side wall portions of the first internal void 20, and is arranged in a tunnel configuration at the arrangement position of the side electrode portion such that the ceiling electrode portion 22a is connected to the bottom electrode portion 22b.

The inner-side pump electrode 22 and the outer-side pump electrode 23 are formed as porous cermet electrodes (for example, cermet electrodes containing Au, Pt, and $ZrO_2$). Note that the inner-side pump electrode 22 that contacts the measurement-object gas is formed using a material whose reduction performance is weakened against the NOx component in the measurement-object gas.

In the main pump cell 21, by applying a desired pump voltage Vp0 between the inner-side pump electrode 22 and the outer-side pump electrode 23 to flow a pump current Ip0 in a positive or negative direction between the inner-side pump electrode 22 and the outer-side pump electrode 23, oxygen inside the first internal void 20 can be pumped out into the outside space or oxygen in the outside space can be pumped into the first internal void 20.

In addition, in order to detect the oxygen concentration (oxygen partial pressure) in the atmosphere in the first internal void 20, an electrochemical sensor cell, that is, an oxygen-partial-pressure detection sensor cell 80 for main pump control is constituted by the inner-side pump electrode 22, the second solid electrolyte layer 6, the spacer layer 5, the first solid electrolyte layer 4, the third substrate layer 3, and the reference electrode 42.

The oxygen concentration (oxygen partial pressure) inside the first internal void 20 becomes apparent by measuring an electromotive force V0 at the oxygen-partial-pressure detection sensor cell 80 for main pump control. Furthermore, the pump current Ip0 is controlled by performing feedback control on the pump voltage Vp0 of a variable power source 24 such that the electromotive force V0 becomes a target value. Consequently, the oxygen concentration inside the first internal void 20 can be maintained at a predetermined constant value.

The third diffusion controlling unit 30 is a portion for adding a predetermined diffusion resistance to the measurement-object gas in which the oxygen concentration (oxygen partial pressure) is controlled by the operation of the main pump cell 21 in the first internal void 20 and for leading the measurement-object gas into the second internal void 40.

The second internal void 40 is provided as a space for further adjusting, using an auxiliary pump cell 50, the oxygen partial pressure in the measurement-object gas that is introduced through the third diffusion controlling unit 30 after the oxygen concentration (oxygen partial pressure) has been adjusted in the first internal void 20 in advance. As a result, the oxygen concentration inside the second internal void 40 can be kept constant with high accuracy, and thus the gas sensor 100 can measure the NOx concentration with high accuracy.

The auxiliary pump cell 50 is an auxiliary electrochemical pump cell constituted by an auxiliary pump electrode 51, the outer-side pump electrode 23, and the second solid electrolyte layer 6. The auxiliary pump electrode 51 has a ceiling electrode portion 51a provided on almost the entirety of the bottom surface of the second solid electrolyte layer 6 that faces the second internal void 40. The outer-side pump electrode 23 does not have to be used, and any appropriate electrode on the outer side of the sensor element 101 suffices.

The auxiliary pump electrode 51 is arranged inside the second internal void 40 in a tunnel configuration similar to that for the inner-side pump electrode 22 provided inside the first internal void 20 described above. That is, the tunnel configuration is formed such that the ceiling electrode portion 51a is formed on the second solid electrolyte layer 6, which provides a ceiling surface of the second internal void 40, a bottom electrode portion 51b is formed on the first solid electrolyte layer 4, which provides a bottom surface of the second internal void 40, and a side electrode portion (not illustrated) that connects the ceiling electrode portion 51a to the bottom electrode portion 51b is formed on both walls of the spacer layer 5 that provide side walls of the second internal void 40. Note that, similarly to the inner-side pump electrode 22, the auxiliary pump electrode 51 is also formed using a material whose reduction performance is weakened against the NOx component in the measurement-object gas.

In the auxiliary pump cell 50, by applying a desired voltage Vp1 between the auxiliary pump electrode 51 and the outer-side pump electrode 23, oxygen in the atmosphere inside the second internal void 40 can be pumped out into the outside space or oxygen can be pumped into the second internal void 40 from the outside space.

In addition, in order to control the oxygen partial pressure in the atmosphere in the second internal void 40, an electrochemical sensor cell, that is, an oxygen-partial-pressure detection sensor cell 81 for auxiliary pump control is constituted by the auxiliary pump electrode 51, the reference electrode 42, the second solid electrolyte layer 6, the spacer layer 5, the first solid electrolyte layer 4, and the third substrate layer 3.

Note that the auxiliary pump cell 50 performs pumping using a variable power source 52 whose voltage is controlled on the basis of an electromotive force V1 detected by the oxygen-partial-pressure detection sensor cell 81 for auxiliary pump control. Consequently, the oxygen partial pressure in the atmosphere inside the second internal void 40 is controlled to a low partial pressure that does not practically affect NOx measurement.

In addition, together with this, a pump current Ip1 for the auxiliary pump cell 50 is used to control the electromotive force V0 of the oxygen-partial-pressure detection sensor cell 80 for main pump control. Specifically, by inputting the pump current Ip1 as a control signal to the oxygen-partial-pressure detection sensor cell 80 for main pump control so that the electromotive force V0 is controlled, control is performed such that the gradient of the oxygen partial pressure in the measurement-object gas that is introduced into the second internal void 40 from the third diffusion controlling unit 30 is always constant. When it is used as a NOx sensor, the oxygen concentration inside the second internal void 40 is maintained at a constant value on the order of about 0.001 ppm due to the operation of the main pump cell 21 and auxiliary pump cell 50.

The fourth diffusion controlling unit 60 is a portion for adding a predetermined diffusion resistance to the measurement-object gas in which the oxygen concentration (oxygen partial pressure) is controlled by the operation of the auxiliary pump cell 50 in the second internal void 40 and for leading the measurement-object gas into the third internal void 61. The fourth diffusion controlling unit 60 serves to control the amount of NOx to flow into the third internal void 61.

The third internal void 61 is provided as a space for performing, on the measurement-object gas that is introduced through the fourth diffusion controlling unit 60 after the oxygen concentration (oxygen partial pressure) has been adjusted in the second internal void 40 in advance, processing regarding measurement of the nitrogen oxide (NOx) concentration in the measurement-object gas. The NOx concentration measurement is mainly performed by the operation of a measurement pump cell 41 at the third internal void 61.

The measurement pump cell 41 measures the NOx concentration in the measurement-object gas inside the third internal void 61. The measurement pump cell 41 is an electrochemical pump cell constituted by a measuring electrode 44, the outer-side pump electrode 23, the second solid electrolyte layer 6, the spacer layer 5, and the first solid electrolyte layer 4. The measuring electrode 44 is provided on the top surface of the first solid electrolyte layer 4 that faces the third internal void 61. The measuring electrode 44 is a porous cermet electrode composed of a material whose reduction performance against the NOx component in the measurement-object gas is made higher than that of the inner-side pump electrode 22. The measuring electrode 44 also functions as a NOx reduction catalyst that reduces NOx present in the atmosphere inside the third internal void 61.

In the measurement pump cell 41, oxygen generated as a result of decomposition of nitrogen oxides in an atmosphere around the measuring electrode 44 is pumped out and its generation amount can be detected as a pump current Ip2.

In addition, in order to detect the oxygen partial pressure around the measuring electrode 44, an electrochemical sensor cell, that is, an oxygen-partial-pressure detection sensor cell 82 for measurement pump control is constituted by the first solid electrolyte layer 4, the third substrate layer 3, the measuring electrode 44, and the reference electrode 42. A variable power source 46 is controlled on the basis of an electromotive force V2 detected by the oxygen-partial-pressure detection sensor cell 82 for measurement pump control.

The measurement-object gas that is introduced into the second internal void 40 reaches the measuring electrode 44 inside the third internal void 61 through the fourth diffusion controlling unit 60 under circumstances where the oxygen partial pressure is controlled. The nitrogen oxides in the measurement-object gas around the measuring electrode 44 are reduced to generate oxygen (2NO→N$_2$+O$_2$). The generated oxygen is pumped by the measurement pump cell 41. In that case, a voltage Vp2 of the variable power source 46 is controlled such that the electromotive force V2 detected by the oxygen-partial-pressure detection sensor cell 82 for measurement pump control becomes constant. The amount of oxygen generated around the measuring electrode 44 is proportional to the nitrogen oxide concentration in the measurement-object gas, and thus the nitrogen oxide concentration in the measurement-object gas is calculated using the pump current Ip2 at the measurement pump cell 41.

In addition, if an oxygen-partial-pressure detection device is constituted as an electrochemical sensor cell by combining the measuring electrode 44, the first solid electrolyte layer 4, the third substrate layer 3, and the reference electrode 42, the electromotive force corresponding to the difference between the amount of oxygen generated by reducing the NOx component in the atmosphere around the measuring electrode 44 and the amount of oxygen contained in a reference atmosphere can be detected, and consequently the concentration of the NOx component in the measurement-object gas can be acquired.

In addition, an electrochemical sensor cell 83 is constituted by the second solid electrolyte layer 6, the spacer layer 5, the first solid electrolyte layer 4, the third substrate layer 3, the outer-side pump electrode 23, and the reference electrode 42. The oxygen partial pressure in the measurement-object gas outside the sensor can be detected using an electromotive force Vref acquired by the sensor cell 83.

In the gas sensor 100 having this configuration, the measurement-object gas in which the oxygen partial pressure is always maintained at a constant low value (a value that does not practically affect NOx measurement) by operating the main pump cell 21 and the auxiliary pump cell 50 is supplied to the measurement pump cell 41. Thus, the NOx concentration in the measurement-object gas can be detected on the basis of the pump current Ip2 caused to flow in rough proportion to the NOx concentration in the measurement-object gas and by the measurement pump cell 41 pumping out oxygen generated by reducing NOx.

Furthermore, in order to improve the oxygen ion conductivity of the solid electrolyte, the sensor element 101 has a heater unit 70 having a temperature adjustment function through which the sensor element 101 is heated and kept warm. The heater unit 70 includes a heater connector electrode 71, a heater 72, a through hole 73, a heater insulating layer 74, and a pressure releasing hole 75.

The heater connector electrode 71 is an electrode formed so as to contact the bottom surface of the first substrate layer 1. By connecting the heater connector electrode 71 to an outside power source, power can be fed to the heater unit 70 from the outside.

The heater 72 is an electrical resistor formed so as to be sandwiched from above and below between the second substrate layer 2 and the third substrate layer 3. The heater 72 is connected to the heater connector electrode 71 via the through hole 73, generates heat by being fed from the outside through the heater connector electrode 71, heats the solid electrolyte that forms the sensor element 101, and keeps the solid electrolyte warm.

In addition, the heater 72 is buried in the entire region from the first internal void 20 to the third internal void 61, and can adjust the temperature of the entire sensor element 101 to a temperature at which the above-described solid electrolyte is activated.

The heater insulating layer 74 is an insulating layer composed of an insulating material such as alumina and formed on the top and bottom surfaces of the heater 72. The heater insulating layer 74 is formed in order to achieve electrical insulation between the second substrate layer 2 and the heater 72 and electrical insulation between the third substrate layer 3 and the heater 72.

The pressure releasing hole 75 is a portion provided so as to penetrate through the third substrate layer 3 and the air introduction layer 48 and communicate with the reference gas introduction space 43, and is formed in order to reduce an internal pressure increase caused by a temperature increase inside the heater insulating layer 74.

The inner-side pump electrode 22 and the auxiliary pump electrode 51 are electrodes containing Pt and Au. More specifically, the inner-side pump electrode 22 is an electrode composed of a cermet composed of Pt and Au serving as precious metal and an oxygen ion conducting oxide (in this case, $ZrO_2$). For each of the inner-side pump electrode 22 and the auxiliary pump electrode 51, the volume ratio between the precious metal component and zirconia is, for example, from 5:5 to 8:2.

For the inner-side pump electrode 22, the Au/Pt ratio (=the area of a portion where Au is exposed/the area of a portion where Pt is exposed) measured using X-ray photoelectron spectroscopy (XPS) is greater than or equal to 0.3 but not greater than 0.63. The higher Au/Pt ratio means that the area of a portion where Pt particles are covered with Au among the Pt particles present in the inner-side pump electrode 22 is larger. The inner-side pump electrode 22 can be formed using, for example, a conductive paste manufactured by mixing coated powder obtained by coating Pt powder with Au, zirconia powder, and a binder. In addition, the Au/Pt ratio of the inner-side pump electrode 22 can be adjusted by changing the weight ratio between Pt and Au in the coated powder as necessary.

The control apparatus 90 is a microprocessor equipped with, for example, a central processing unit (CPU) 92 and a memory 94. The control apparatus 90 receives the electromotive force V0 detected by the oxygen-partial-pressure detection sensor cell 80 for main pump control, the electromotive force V1 detected by the oxygen-partial-pressure detection sensor cell 81 for auxiliary pump control, the electromotive force V2 detected by the oxygen-partial-pressure detection sensor cell 82 for measurement pump control, the electromotive force Vref detected by the sensor cell 83, the pump current Ip0 detected by the main pump cell 21, the pump current Ip1 detected by the auxiliary pump cell 50, and the pump current Ip2 detected by the measurement pump cell 41. In addition, the control apparatus 90 outputs a control signal to the variable power sources 24, 46, and 52, and controls the main pump cell 21, the measurement pump cell 41, and the auxiliary pump cell 50.

The control apparatus 90 performs feedback control on the pump voltage Vp0 of the variable power source 24 such that the electromotive force V0 becomes a target value (referred to as a target value V0*) (that is, such that the oxygen concentration in the first internal void 20 becomes a target concentration). Thus, the pump current Ip0 changes in accordance with the oxygen concentration in the measurement-object gas, and by extension the air fuel ratio (A/F) and the excess air ratio λ (=the air volume supplied to the internal combustion engine/a theoretically required minimum air volume) of the measurement-object gas.

In addition, the control apparatus 90 performs feedback control on the voltage Vp1 of the variable power source 52 such that the electromotive force V1 becomes a constant value (referred to as a target value V1*) (that is, such that the oxygen concentration in the second internal void 40 becomes a predetermined low oxygen concentration that does not practically affect the NOx measurement). Along with this, the control apparatus 90 sets (performs feedback control on) the target value V0* for the electromotive force V0 on the basis of the pump current Ip1 such that the pump current Ip1 that is caused to flow by the voltage Vp1 becomes a constant value (referred to as a target value Ip1*). As a result, the gradient of the oxygen partial pressure in the measurement-object gas that is introduced into the second internal void 40 from the third diffusion controlling unit 30 becomes always constant. In addition, the oxygen partial pressure in the atmosphere inside the second internal void 40 is controlled to a low partial pressure that does not practically affect the NOx measurement. The target value V0* is set to a value with which the oxygen concentration in the first internal void 20 becomes higher than 0% and remains low.

Furthermore, the control apparatus 90 performs feedback control on the voltage Vp2 of the variable power source 46 such that the electromotive force V2 becomes a constant value (referred to as a target value V2*) (that is, such that the oxygen concentration in the third internal void 61 becomes a predetermined low concentration). As a result, oxygen is pumped out from the third internal void 61 such that the amount of oxygen generated by reducing, in the third internal void 61, NOx in the measurement-object gas becomes practically zero. The control apparatus 90 then acquires the pump current Ip2 as a detection value corresponding to oxygen originated from the specific gas (in this case, NOx) and generated in the third internal void 61, and calculates, on the basis of the pump current Ip2, the NOx concentration in the measurement-object gas. In this manner, a system in which oxygen originated from the measurement-object gas that is introduced into the sensor element 101 is pumped out and the specific gas concentration is detected on the basis of the amount of oxygen pumped out (on the basis of the pump current Ip2 in the present embodiment) is called a limiting current method.

In the memory 94, for example, a relational expression (for example, a linear function equation) or a map is stored as a correspondence relationship between the pump current Ip2 and the NOx concentration. The relational expression or map can be obtained in advance by experiment.

Examples of the use of the gas sensor 100 configured in this manner will be described below. Suppose that the CPU 92 of the control apparatus 90 is in a state in which the CPU 92 controls each of the above-described pump cells 21, 41, and 50 and acquires each of the voltages V0, V1, V2, and Vref from the above-described respective sensor cells 80 to 83. In this state, in a case where the measurement-object gas is introduced from the gas inlet 10, the measurement-object gas passes through the first diffusion controlling unit 11, the buffer space 12, and the second diffusion controlling unit 13 and reaches the first internal void 20. Next, the oxygen concentration in the measurement-object gas is adjusted by the main pump cell 21 and the auxiliary pump cell 50 in the first internal void 20 and the second internal void 40, and the adjusted measurement-object gas reaches the third internal void 61. The CPU 92 then detects the NOx concentration in the measurement-object gas, on the basis of the acquired pump current Ip2 and the correspondence relationship stored in the memory 94.

In the present embodiment, in a case where the CPU 92 detects the NOx concentration using the sensor element 101 in this manner, when the Au/Pt ratio of the inner-side pump electrode 22 is greater than or equal to 0.3 as described above, a decrease in the accuracy with which the NOx concentration is measured can be suppressed in a case where the measurement-object gas is in a rich atmosphere (the excess air ratio λ<1). The reason for this can be considered as in the following. Since the oxygen partial pressure in the rich-atmosphere measurement-object gas is low, in a case where the rich-atmosphere measurement-object gas is introduced into the first internal void 20, it is considered that NOx reduction occurs inside the first internal void 20 due to the catalytic activity of Pt contained in the inner-side pump electrode 22 before the rich-atmosphere measurement-object gas reaches the third internal void 61. In a case where the measurement-object gas is in a rich atmosphere, since for example hydrocarbon (HC) and carbon monoxide are present as unburned components in the measurement-object gas, it is considered that NOx reacts with the unburned components and NOx is more likely to be reduced inside the first internal void 20. When such NOx reduction occurs in the first internal void 20, it is considered that the amount of oxygen originated from NOx and generated in the third internal void 61 decreases and the NOx concentration measurement accuracy decreases. In contrast to this, in the sensor element 101 according to the present embodiment, since the Au/Pt ratio of the inner-side pump electrode 22 is greater than or equal to 0.3, the existence of Au sufficiently suppresses the catalytic activity of Pt. Consequently, it is considered that NOx reduction in the first internal void 20 is sufficiently suppressed in a case where the measurement-object gas is in a rich atmosphere and a decrease in the accuracy with which the NOx concentration is detected is suppressed.

Here, in a case where the measurement-object gas that has reached the first internal void 20 is in a lean atmosphere, the control apparatus 90 basically controls the main pump cell 21 so as to pump out oxygen from the first internal void 20. In this case, not only oxygen molecules inside the first internal void 20 are pumped out but also oxygen in NOx as a result of NOx reduction may also be pumped out. In order to suppress NOx reduction caused by the pumping out of oxygen in this manner, a Au/Pt ratio of between 0.01 and 0.3 inclusive is sufficient. In contrast to this, in a case where the measurement-object gas that has reached the first internal void 20 is in a rich atmosphere, the control apparatus 90 controls the main pump cell 21 so as to pump oxygen into the first internal void 20, and thus the above-described NOx reduction caused by the pumping out of oxygen does not occur. Instead, it is considered that regardless of the operation of the main pump cell 21, the above-described NOx reduction inside the first internal void 20 occurs due to the catalytic activity of Pt contained in the inner-side pump electrode 22. In order to suppress NOx reduction based on this reason, a Au/Pt ratio of between 0.01 and 0.3 inclusive may be insufficient and the Au/Pt ratio needs to be greater than or equal to 0.3. Hitherto, the use of a rich-atmosphere gas as a measurement-object gas has not been considered so much, so these findings are newly made by the inventors.

In this manner, since the sensor element 101 according to the present embodiment can suppress a decrease in the accuracy with which the NOx concentration is measured in a case where the measurement-object gas is in a rich atmosphere (the excess air ratio $\lambda<1$), it is specifically suitable for a case where the NOx concentration in a rich-atmosphere measurement-object gas is measured. In addition, the sensor element 101 according to the present embodiment can also be used for measurement of the NOx concentration in a case where a measurement-object gas is not in a rich atmosphere. Thus, the sensor element 101 according to the present embodiment is suitable for measurement of the NOx concentration in not only "a measurement-object gas that is always in a rich atmosphere at the time of measurement" but also "a measurement-object gas that may be in a rich atmosphere at the time of measurement". For example, in a gasoline engine, the air fuel ratio of exhaust gas often stays near a theoretical air fuel ratio, and the measurement-object gas may be always in a rich atmosphere or may be frequently in a rich atmosphere. Thus, the sensor element 101 according to the present embodiment is suitable for detection of the NOx concentration in exhaust gas of a gasoline engine. In addition, the lower the A/F of the measurement-object gas (the lower the excess air ratio $\lambda$), the more likely the above-described NOx reduction occurs in the first internal void 20, and thus it is meaningful to use the sensor element 101 according to the present embodiment in which the Au/Pt ratio of the inner-side pump electrode 22 is greater than or equal to 0.3. For example, the sensor element 101 is suitable for detection of the NOx concentration in the measurement-object gas in which the A/F is less than or equal to 13.5 (the excess air ratio $\lambda$ is less than or equal to 0.918). The measurement-object gas may have an A/F of 11 or higher (the excess air ratio $\lambda$ is greater than or equal to 0.748).

The greater the Au/Pt ratio of the inner-side pump electrode 22, the further the above-described NOx reduction in the first internal void 20 can be suppressed. From this point of view, the Au/Pt ratio of the inner-side pump electrode 22 is preferably over 0.3 and more preferably over 0.35. In addition, the Au/Pt ratio of the inner-side pump electrode 22 may also be over 0.5.

In addition, in a case where the Au/Pt ratio of the inner-side pump electrode 22 is too high, the pump performance of the main pump cell 21 is degraded and it may not be possible to appropriately adjust the oxygen concentration in the first internal void 20 or application of the pump voltage Vp0 may be needed to improve the pump performance. In contrast to this, in the sensor element 101 according to the present embodiment, since the Au/Pt ratio of the inner-side pump electrode 22 is less than or equal to 0.63, a decrease in the pump performance of the main pump cell 21 can be suppressed.

The Au/Pt ratio of the auxiliary pump electrode 51 may be greater than or equal to 0.3 but not greater than 0.63, similarly to the inner-side pump electrode 22; however, preferably the Au/Pt ratio of the auxiliary pump electrode 51 is lower than that of the inner-side pump electrode 22. Here, even in a case where the measurement-object gas is in a rich atmosphere, the measurement-object gas whose oxygen concentration has been adjusted reaches the second internal void 40 arranged downstream of the first internal void 20. More specifically, the measurement-object gas into which oxygen has been pumped by the main pump cell 21 reaches the second internal void 40. Thus, the above-described NOx reduction is less likely to occur in the second internal void 40 than in the first internal void 20. Thus, even when the Au/Pt ratio of the auxiliary pump electrode 51 has a lower value than that of the inner-side pump electrode 22, a decrease in the NOx concentration measurement accuracy is less likely to occur in a case where the measurement-object gas is in a rich atmosphere. By setting the Au/Pt ratio of the auxiliary pump electrode 51 to relatively low, the pump performance of the auxiliary pump cell 50 can be made relatively high. The Au/Pt ratio of the auxiliary pump electrode 51 is preferably less than or equal to 0.3 and more preferably less than 0.3. In addition, the Au/Pt ratio of the auxiliary pump electrode 51 may also be greater than or equal to 0.01.

Here, a correspondence relationship between structural elements of the present embodiment and structural elements of the present invention will be made clear. The layered body obtained by staking the six layers, which are the first substrate layer 1, the second substrate layer 2, the third substrate layer 3, the first solid electrolyte layer 4, the spacer layer 5, and the second solid electrolyte layer 6 according to the present embodiment, in this order corresponds to a layered body according to the present invention. The first internal void 20 corresponds to an oxygen concentration adjustment space according to the present invention. The inner-side pump electrode 22 corresponds to an adjustment pump electrode according to the present invention. The main pump cell 21 corresponds to an adjustment pump cell according to the present invention. The third internal void 61 corresponds to a measurement space according to the present invention. The measuring electrode 44 corresponds to a measuring electrode according to the present invention. The reference electrode 42 corresponds to a reference electrode according to the present invention. In addition, the second internal void 40 corresponds to an auxiliary adjustment space according to the present invention. The auxiliary pump electrode 51 corresponds to an auxiliary pump electrode according to the present invention. The auxiliary pump cell 50 corresponds to an auxiliary pump cell according to the present invention. Furthermore, the CPU 92 and variable power source 24 correspond to an adjustment-pump-cell control device according to the present invention. The CPU 92 corresponds to a specific-gas-concentration detection device according to the present invention. The oxygen-partial-pressure detection sensor cell 82 for measurement pump control corresponds to a measurement-voltage detection device according to the present invention. The pump current Ip2 corresponds to a detection value according to the present invention.

With the gas sensor 100 according to the present embodiment described above, the Au/Pt ratio of the inner-side pump electrode 22 is greater than or equal to 0.3, and thus a decrease in the accuracy with which the NOx concentration is measured can be suppressed in a case where the measurement-object gas is in a rich atmosphere. In addition, the Au/Pt ratio of the inner-side pump electrode 22 is less than or equal to 0.63, and thus a decrease in the pump performance of the main pump cell 21 can be suppressed.

In addition, the layered body (the individual layers 1 to 6) of the sensor element 101 includes three or more electrodes (in this case, three electrodes, which are the inner-side pump electrode 22, the auxiliary pump electrode 51, and the measuring electrode 44) arranged in the measurement-object gas distribution portion. The inner-side pump electrode 22 is arranged furthermost upstream among these electrodes. Here, in a case where the inner-side pump electrode 22 is arranged furthermost upstream among the plurality of electrodes arranged in the measurement-object gas distribution portion, the oxygen concentration in the measurement-object gas cannot be adjusted upstream of the inner-side pump electrode 22. Thus, when the Au/Pt ratio of the inner-side pump electrode 22 present at such a position is low, NOx reduction is likely to occur in the first internal void 20 in a case where the measurement-object gas is in a rich atmosphere. Thus, by setting the Au/Pt ratio of the inner-side pump electrode 22 present at such a position to 0.3 or higher, a decrease in the accuracy with which the NOx concentration is measured can be suppressed with more certainty in a case where the measurement-object gas is in a rich atmosphere.

Furthermore, the Au/Pt ratio of the auxiliary pump electrode 51 is lower than the Au/Pt ratio of the inner-side pump electrode 22, and thus the pump performance of the auxiliary pump cell 50 can be made relatively high. Furthermore, exhaust gas of a gasoline engine is relatively likely to be in a rich atmosphere, and thus it is meaningful to use the sensor element 101 in order to detect the NOx concentration in this exhaust gas.

Note that the present invention is not limited to the above-described embodiment in any respect, and it goes without saying that various modes can be executed as long as they fall within the technical scope of the present invention.

In the above-described embodiment, the gas sensor 100 detects the NOx concentration as the specific gas concentration; however, what is detected is not limited to this and the concentration of a different oxide may also be detected as the specific gas concentration. In a case where the specific gas is an oxide, similarly to as in the above-described embodiment, oxygen is generated when the specific gas itself is reduced in the third internal void 61. Thus the CPU 92 can detect the specific gas concentration by acquiring a detection value corresponding to this oxygen. In addition, the specific gas may also be a non-oxide such as ammonia. In a case where the specific gas is a non-oxide, by converting the specific gas into an oxide (for example, in the case of ammonia, it is converted into NO), oxygen is generated when the gas resulting from the conversion is reduced in the third internal void 61. Thus the CPU 92 can detect the specific gas concentration by acquiring a detection value corresponding to this oxygen. For example, in a case where the measurement-object gas that has reached the first internal void 20 is in a rich atmosphere, the control apparatus 90 controls the main pump cell 21 so as to pump oxygen into the first internal void 20, and thus ammonia can be converted into NO by reaction with oxygen pumped into the first internal void 20. Thereafter, the ammonia concentration can be detected basically on the basis of the same principle as in the NOx concentration measurement. In addition, in this case too, in a case where the measurement-object gas is in a rich atmosphere, it is considered that NO generated by converting ammonia is likely to be reduced due to the catalytic activity of Pt contained in the inner-side pump electrode 22. In contrast to this, since the Au/Pt ratio of the inner-side pump electrode 22 is greater than or equal to 0.3, similarly to as in the above-described embodiment, NO reduction in the first internal void 20 is sufficiently suppressed and a decrease in the accuracy with which the ammonia concentration is measured can be suppressed.

In the above-described embodiment, both the main pump cell 21 and the auxiliary pump cell 50 include the outer-side pump electrode 23 as a constituent element; however, what can be included is not limited to this. That is, the outer-side pump electrode 23 serves as both an adjustment outer electrode of the main pump cell 21 and an auxiliary outer electrode of the auxiliary pump cell 50; however, what can be included is not limited to this. The adjustment outer electrode and the auxiliary outer electrode may also be separately provided at an outside portion of the layered body (the individual layers 1 to 6) exposed to the measurement-object gas.

Figure 3:
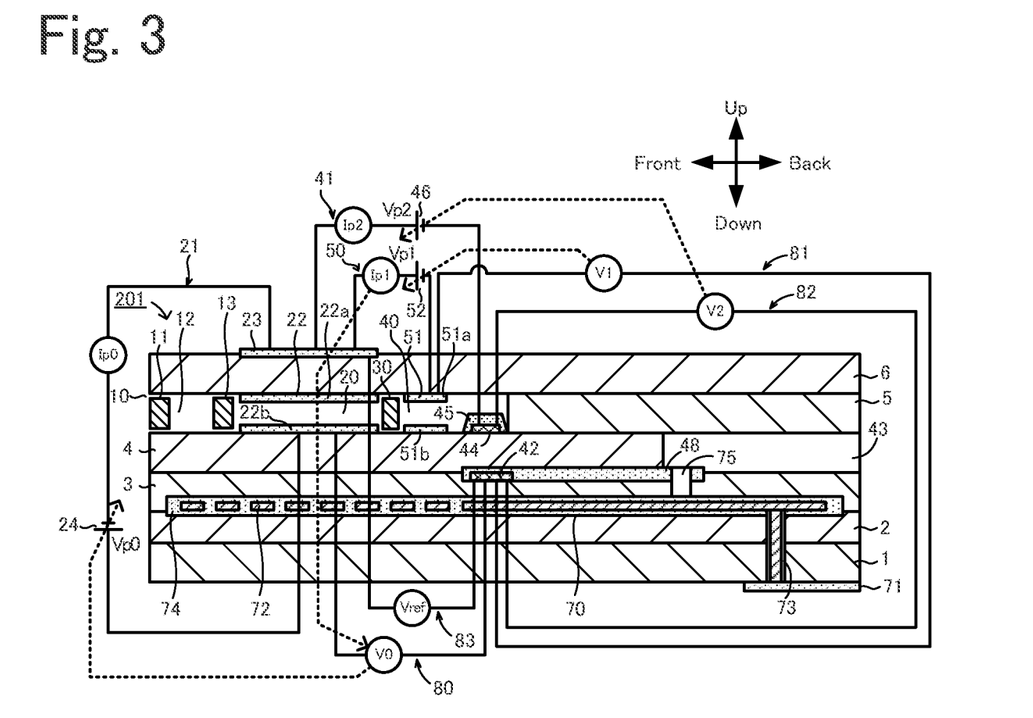
FIG. 3 is a schematic sectional view of a sensor element 201.

In the above-described embodiment, the sensor element 101 of the gas sensor 100 includes the first internal void 20, the second internal void 40, and the third internal void 61; however, what the sensor element 101 includes is not limited to this. For example, as in a sensor element 201 of FIG. 3, the third internal void 61 may be excluded. In the sensor element 201 according to a modification illustrated in FIG. 3, the gas inlet 10, the first diffusion controlling unit 11, the buffer space 12, the second diffusion controlling unit 13, the first internal void 20, the third diffusion controlling unit 30, and the second internal void 40 are formed so as to communicate in this order and to be adjacent to each other between the bottom surface of the second solid electrolyte layer 6 and the top surface of the first solid electrolyte layer 4. In addition, the measuring electrode 44 is provided on the top surface of the first solid electrolyte layer 4 inside the second internal void 40. The measuring electrode 44 is covered by a fourth diffusion controlling unit 45. The fourth diffusion controlling unit 45 is a film composed of a ceramic porous material such as alumina ($Al_2O_3$). Similarly to the fourth diffusion controlling unit 60 in the above-described embodiment, the fourth diffusion controlling unit 45 serves to control the amount of NOx to flow onto the measuring electrode 44. In addition, the fourth diffusion controlling unit 45 also functions as a protection film of the measuring electrode 44. The ceiling electrode portion 51a of the auxiliary pump electrode 51 is formed so as to extend to directly above the measuring electrode 44. Similarly to as in the above-described embodiment, even the sensor element 201 having this configuration can detect, for example, the NOx concentration on the basis of the pump current Ip2. In this case, a space around the measuring electrode 44 functions as a measurement space.

EXAMPLES

In the following, an example in which a sensor element is specifically manufactured will be described as an example. Experimental Examples 3 to 5 correspond to examples of the present invention, and Experimental Examples 1, 2, and 6 correspond to comparative examples. Note that the present invention is not limited to the following examples.

[Manufacture of Sensor Element of Experimental Examples 1 to 6]

The sensor element 101 illustrated in FIG. 1 was manufactured in Experimental Examples 1 to 6. In Experimental Examples 1 to 6, the sensor element was manufactured in the same way except that the value of the Au/Pt ratio of the inner-side pump electrode 22 was different from experimental example to experimental example. First, six ceramic green sheets were prepared that were formed by mixing 4 mol % yttria-stabilized zirconia particles, an organic binder, and an organic solvent together and performing tape forming. In these green sheets, a plurality of sheet holes used for positioning at the time of printing and at the time of layer stacking, a plurality of necessary through holes, and the like were formed in advance. In addition, a conductive paste pattern for forming each electrode was printed on each of the green sheets. The six green sheets were stacked in a predetermined order, and were pressed and fit under predetermined temperature and pressure conditions. An unfired layered body having a size of the sensor element 101 was cut out from the press-fit product obtained in this manner. The cut-out unfired layered body was then fired and the sensor element 101 was obtained. A conductive paste for the inner-side pump electrode 22 was manufactured by mixing coated powder obtained by coating Pt powder with Au, zirconia powder, and a binder. In Experimental Examples 1 to 6, the Au/Pt ratio of the inner-side pump electrode 22 was made different from experimental example to experimental example by changing the weight ratio between Pt and Au in the coated powder as necessary. A conductive paste for the auxiliary pump electrode 51 was similarly manufactured. The conductive paste for the auxiliary pump electrode 51 was used in common in Experimental Examples 1 to 6.

[Au/Pt Ratio Measurement]

A plurality of sensor elements 101 of Experimental Example 1 were manufactured, and some (three) of the sensor elements 101 were cut to expose the surface of the inner-side pump electrode 22 to the outside. The Au/Pt ratio of the inner-side pump electrode 22 was measured using X-ray photoelectron spectroscopy (XPS). The Au/Pt ratio was calculated using a relative sensitivity factor method on the basis of the peak intensity of a detected peak of Au and that of Pt. As a relative sensitivity factor, an atomic relative sensitivity factor (ARSF) was used. The average of the measured Au/Pt ratios of the three inner-side pump electrodes 22 was treated as the Au/Pt ratio of the inner-side pump electrode 22 of Experimental Example 1. The Au/Pt ratio was similarly measured also for Experimental Examples 2 to 6. Measurement conditions for the Au/Pt ratio were as follows.

Measurement Apparatus: QuanteraS manufactured by Physical Electronics Inc.;
X-ray source: monochromatized Al (1486.6 eV);
Detection area: 100 μmØ;
Detection Depth: about 4 to 5 nm
Spectroscope: an electrostatic hemispherical energy analyzer
Extraction angle: 45°
Angle between X-ray and spectroscope: 90°
Detected spectrum (detected peak): Au4f, Pt4f
Measurement results for the Au/Pt ratio of the inner-side pump electrode 22 were 0 in Experimental Example 1, 0.21 in Experimental Example 2, 0.3 in Experimental Example 3, 0.47 in Experimental Example 4, 0.63 in Experimental Example 5, and 1 in Experimental Example 6. In addition, the Au/Pt ratio of the auxiliary pump electrode 51 was similarly measured and it was 0.20 in any of Experimental Examples 1 to 6.

[Evaluation Test 1: Measurement Accuracy Evaluation]

Figure 4:
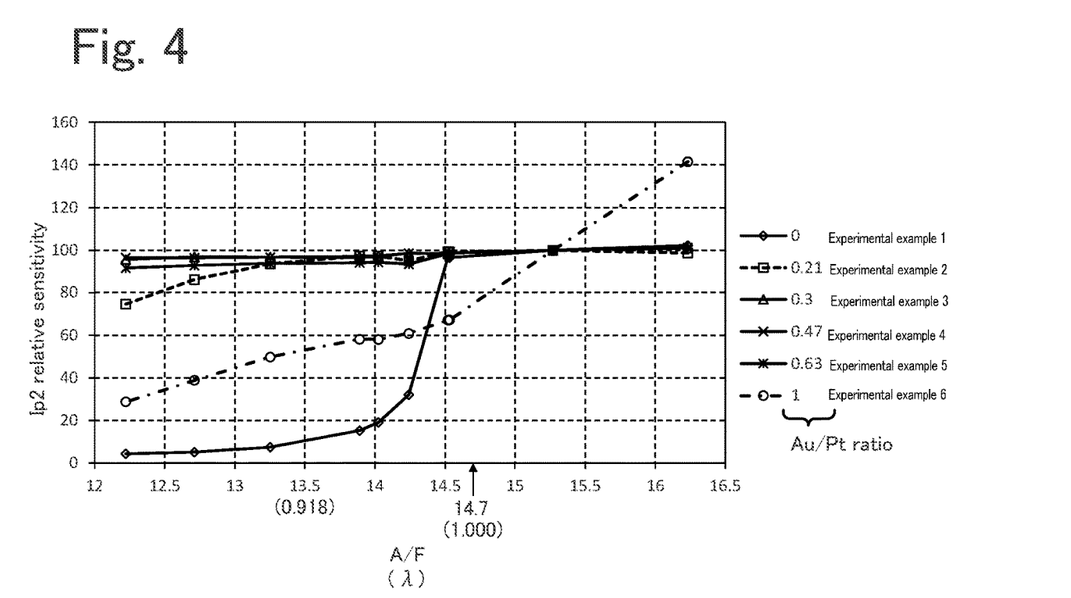
FIG. 4 is a graph illustrating a relationship between the A/F of a measurement-object gas and an Ip2 relative sensitivity in each of Experimental Examples 1 to 6.

The sensor element 101 of Experimental Example 1 was connected to the control apparatus 90 and the variable power sources 24, 46, and 52 described above, and the sensor element 101 was driven by the control apparatus 90 similarly to as in the above-described embodiment. The pump current Ip2 was then measured while the A/F of measurement-object gas that had not yet been introduced into the gas inlet 10 of the sensor element 101 was being variously changed. As the measurement-object gas, a model gas was used. The model gas used nitrogen as a base gas and 500 ppm NO as a specific gas component, and its moisture concentration was 3 vol %. Ethylene gas ($C_2H_4$) was used as a combustion gas, and the A/F of the model gas was variously changed by variously changing the ethylene gas concentration and the oxygen concentration in the model gas. The model gas was set to have a temperature of 250° C. and was circulated in a pipe having a diameter of 20 mm at a flow rate of 200 L/min. The pump current Ip2 was measured after the model gas started circulating and the pump current Ip2 became sufficiently stable. In addition, ten model gases that are different in A/F were used as the measurement-object gas. For each A/F, the pump current Ip2 corresponding to the A/F was measured. The A/F was measured using MEXA-760λ manufactured by HORIBA, Ltd. The pump current Ip2 for when the A/F of the measurement-object gas was 15.27 was set to a value of 100, and the value into which the measured pump current Ip2 was relativized (referred to as Ip2 relative sensitivity) was derived. For Experimental Examples 2 to 6 too, the Ip2 relative sensitivity was derived by using substantially the same method. For each of Experimental Examples 1 to 6, the Au/Pt ratio of the inner-side pump electrode 22 and the Ip2 relative sensitivity corresponding to the A/F of the measurement-object gas are shown in Table 1. In addition, FIG. 4 is a graph illustrating a relationship between the A/F of the measurement-object gas and the Ip2 relative sensitivity in each of Experimental Examples 1 to 6. It means that the further the Ip2 relative sensitivity changes from 100, the lower the NOx concentration measurement accuracy becomes. In Table 1, the excess air ratio λ (=(A/F)/14.7) converted from the A/F is also written. In FIG. 4 too, the excess air ratios λ corresponding to an A/F of 14.7 and an A/F of 13.5 are also written in parentheses.

TABLE 1

| Au/Pt ratio | Experimental example 1 | Experimental example 2 | Experimental example 3 | Experimental example 4 | Experimental example 5 | Experimental example 6 |
|---|---|---|---|---|---|---|
| | 0 | 0.21 | 0.3 | 0.47 | 0.63 | 1 |
| A/F | λ | | | Ip2 relative sensitivity | | | |
| 16.23 | 1.104 | 102.27 | 98.79 | 101.10 | 101.17 | 101.10 | 141.54 |
| 15.27 | 1.039 | 100.00 | 100.00 | 100.00 | 100.00 | 100.00 | 100.00 |
| 14.53 | 0.988 | 96.59 | 99.31 | 98.76 | 98.72 | 98.75 | 67.15 |
| 14.52 | 0.988 | 96.94 | 99.50 | 98.42 | 98.39 | 98.42 | 67.06 |
| 14.24 | 0.969 | 32.07 | 95.09 | 98.53 | 98.60 | 93.54 | 60.84 |
| 14.02 | 0.954 | 19.06 | 97.26 | 97.39 | 97.13 | 94.39 | 58.03 |
| 13.89 | 0.945 | 15.33 | 97.30 | 97.17 | 96.64 | 94.17 | 58.15 |
| 13.25 | 0.902 | 7.52 | 93.70 | 96.82 | 96.86 | 93.82 | 49.78 |
| 12.71 | 0.865 | 5.20 | 86.08 | 96.94 | 96.48 | 92.95 | 38.86 |
| 12.22 | 0.831 | 4.47 | 74.54 | 95.72 | 96.57 | 91.72 | 28.77 |

As is clear from Table 1 and FIG. 4, in a case where the measurement-object gas had a theoretical air fuel ratio (A/F=14.7, λ=1) or in a lean atmosphere (A/F>14.7, λ>1), the Ip2 relative sensitivity in any of Experimental Examples 1 to 5 was 100 or a value near 100, and even when the A/F (and λ) changed, a decrease in the measurement accuracy was not observed. In contrast to this, in a case where the measurement-object gas was in an area of a rich atmosphere (A/F<14.7, λ<1), in Experimental Examples 1 and 2 in which the Au/Pt ratio of the inner-side pump electrode 22 was less than 0.3, the lower the A/F (and λ) became, the lower the Ip2 relative sensitivity and the NOx concentration measurement accuracy became. In contrast to this, in Experimental Examples 3 to 5 in which the Au/Pt ratio of the inner-side pump electrode 22 was greater than or equal to 0.3, even when the A/F (and λ) in the rich atmosphere area became low, a decrease in the Ip2 relative sensitivity was not so clearly observed, and the NOx concentration measurement accuracy remained high. In addition, in Experimental Example 1, a decrease in the NOx concentration measurement accuracy was observed in an area where the A/F of the measurement-object gas was less than or equal to 14.7 (λ was less than or equal to 1). However, in Experimental Example 2, a decrease in the NOx concentration measurement accuracy was observed only in an area where the A/F of the measurement-object gas was less than or equal to 13.5 (λ is less than or equal to 0.918). In addition, the comparison between Experimental Examples 1 and 2 showed that as the Au/Pt ratio of the inner-side pump electrode 22 decreased, there was a tendency for the NOx concentration measurement accuracy to decrease markedly in a case where the measurement-object gas was in a rich atmosphere.

In addition, in Experimental Example 6 in which the Au/Pt ratio of the inner-side pump electrode 22 was 1, regardless of whether the measurement-object gas was in a rich atmosphere, had the theoretical air fuel ratio, or was in a lean atmosphere, the Ip2 relative sensitivity changed as the A/F (and λ) changed. In order to further study this, for Experimental Examples 1 to 6, the pump performance of the main pump cell 21 of the sensor element 101 was evaluated as in the following.

[Evaluation Test 2: Evaluation of Pump Performance of Main Pump Cell]

A model gas in which the base gas was nitrogen, the oxygen concentration was 1 vol %, and the moisture concentration was 3% was prepared as a measurement-object gas, and was introduced into the gas inlet 10 of the sensor element 101 of Experimental Example 1. The measurement-object gas was set to have a temperature of 250° C. and was circulated in a pipe having a diameter of 20 mm at a flow rate of 200 L/min. In this state, the pump current Ip0 flowing in the main pump cell 21 was measured while the pump voltage Vp0 of the main pump cell 21 applied by the variable power source 24 was being variously changed between 0.02 V and 0.6 V. For Experimental Examples 2 to 6, the pump current Ip0 was measured in substantially the same manner. For each of Experimental Examples 1 to 6, the relationship between the Au/Pt ratio of the inner-side pump electrode 22, the pump voltage Vp0, and the pump current Ip0 will be illustrated in Table 2 and FIG. 5.

TABLE 2

| Au/Pt ratio Pump Voltage Vp0[V] | Experimental example 1 | Experimental example 2 | Experimental example 3 | Experimental example 4 | Experimental example 5 | Experimental example 6 |
|---|---|---|---|---|---|---|
| | 0 | 0.21 | 0.3 | 0.47 | 0.63 | 1 |
| | | | Pump current Ip0[A] | | | |
| 0.02 | 0.0001 | 0.00008 | 0.00005 | 0.00003 | 0.00002 | 0 |
| 0.1 | 0.00029 | 0.00028 | 0.00026 | 0.00024 | 0.00022 | 0.00012 |
| 0.2 | 0.0003 | 0.000295 | 0.00028 | 0.00028 | 0.00027 | 0.00016 |
| 0.3 | 0.0003 | 0.0003 | 0.00029 | 0.00029 | 0.000285 | 0.00019 |
| 0.4 | 0.0003 | 0.0003 | 0.0003 | 0.000295 | 0.000295 | 0.00022 |
| 0.5 | 0.0003 | 0.0003 | 0.0003 | 0.0003 | 0.0003 | 0.00024 |
| 0.6 | 0.0003 | 0.0003 | 0.0003 | 0.0003 | 0.0003 | 0.00025 |

Figure 5:
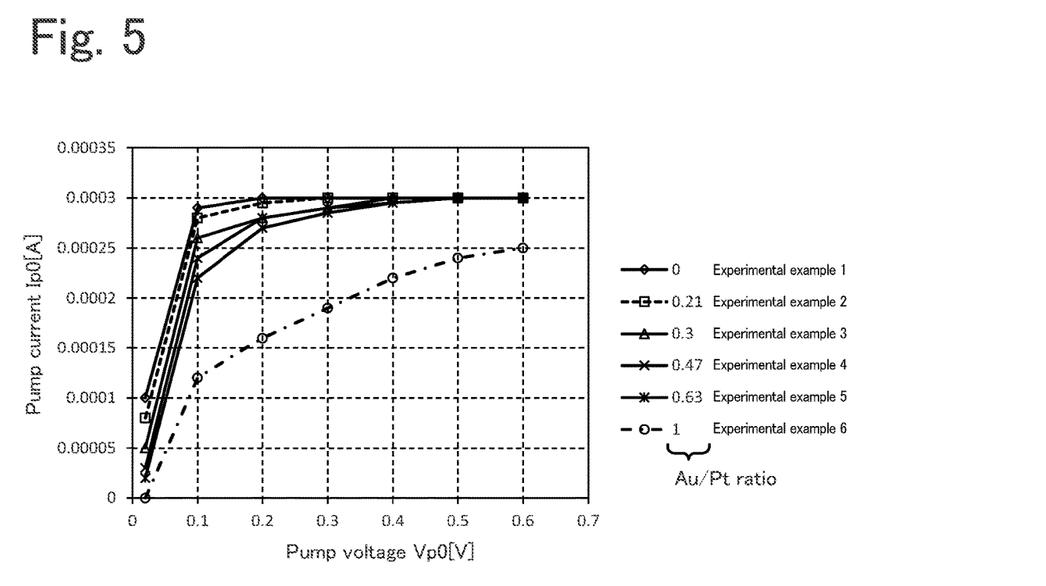
FIG. 5 is a graph illustrating a relationship between a pump voltage Vp0 and a pump current Ip0 in each of Experimental Examples 1 to 6.

As is clear from Table 2 and FIG. 5, in any of Experimental Examples 1 to 5 in which the Au/Pt ratio of the inner-side pump electrode 22 was less than or equal to 0.63, the pump current Ip0 was almost constant in an area where at least the pump voltage Vp0 was greater than or equal to 0.4 V. This means that the main pump cell 21 was able to sufficiently pump out oxygen in the measurement-object gas and the pump current Ip0 became a limiting current. In contrast to this, in Experimental Example 6 in which the Au/Pt ratio of the inner-side pump electrode 22 was over 0.63, the pump current Ip0 did not become the limiting current when the pump voltage Vp0 was in the range from 0.02 V to 0.6 V. This means that the pump performance of the main pump cell 21 was low in Experimental Example 6. When the pump performance of the main pump cell 21 is low, in a case where the measurement-object gas is in a lean atmosphere, oxygen in the first internal void 20 cannot be sufficiently pumped out, and the pump current Ip2 becomes higher than the correct value corresponding to the NOx concentration in the measurement-object gas. In addition, when the pump performance of the main pump cell 21 is low, in a case where the measurement-object gas is in a rich atmosphere, oxygen cannot be sufficiently pumped into the first internal void 20, the pump current Ip2 becomes lower than the correct value corresponding to the NOx concentration in the measurement-object gas. Due to this, it is conceivable in Experimental Example 6 that the higher the A/F (and λ) of the measurement-object gas, the greater the Ip2 relative sensitivity (the lower the A/F and λ, the lower the Ip2 relative sensitivity) as illustrated in FIG. 4. This result shows that preferably the Au/Pt ratio of the inner-side pump electrode 22 is less than or equal to 0.63.

What is claimed is:

1. A sensor element used to detect, using a limiting current method, a specific gas concentration in a rich-atmosphere measurement-object gas, the sensor element comprising:
    a layered body that has stacked oxygen-ion conducting multiple solid electrolyte layers and in which a measurement-object gas distribution portion for introducing and distributing the measurement-object gas is provided;
    an adjustment pump cell that has an adjustment pump electrode arranged in an oxygen concentration adjustment space in the measurement-object gas distribution portion and that is for adjusting a concentration of oxygen in the oxygen concentration adjustment space;
    a measuring electrode arranged in a measurement space provided downstream of the oxygen concentration adjustment space in the measurement-object gas distribution portion;
    a reference electrode that is arranged inside the layered body and into which a reference gas serving as a reference for detection of the specific gas concentration is introduced,
    wherein
    the adjustment pump electrode contains Pt and Au, and a Au/Pt ratio (=the area of a portion where Au is exposed/the area of a portion where Pt is exposed) measured using X-ray photoelectron spectroscopy (XPS) is greater than or equal to 0.3 but not greater than 0.63; and
    an auxiliary pump cell that has an auxiliary pump electrode arranged in an auxiliary adjustment space downstream of the oxygen concentration adjustment space in the measurement-object gas distribution portion and that is for adjusting the concentration of oxygen in the auxiliary adjustment space,
    wherein
    the auxiliary pump electrode contains Pt and Au, and a Au/Pt ratio (=the area of a portion where Au is exposed/the area of a portion where Pt is exposed) measured using X-ray photoelectron spectroscopy (XPS) is lower than the Au/Pt ratio of the adjustment pump electrode.

2. The sensor element according to claim 1, wherein the layered body includes three or more electrodes including the adjustment pump electrode and the measuring electrode arranged in the measurement-object gas distribution portion, and the adjustment pump electrode is arranged furthermost upstream among the three or more electrodes arranged in the measurement-object gas distribution portion.

3. The sensor element according to claim 1, wherein the Au/Pt ratio of the adjustment pump electrode is over 0.3.

4. The sensor element according to claim 1, wherein the specific gas concentration is the concentration of NOx or the concentration of ammonia.

5. The sensor element according to claim 1, the sensor element being used to detect the specific gas concentration in exhaust gas of a gasoline engine.

6. A gas sensor comprising:
    the sensor element according to claim 1; and
    a processor programmed to operate the adjustment pump cell such that the concentration of oxygen in the oxygen concentration adjustment space becomes a target concentration;
    an oxygen-partial-pressure detection sensor cell that detects a measurement voltage between the reference electrode and the measuring electrode; and
    the processor being further programmed to acquire, on the basis of the measurement voltage, a detection value corresponding to oxygen originated from the specific gas and generated in the measurement space and detect, on the basis of the detection value, the specific gas concentration in the measurement-object gas.

* * * * *